United States Patent
Balducci et al.

(10) Patent No.: US 7,359,991 B2
(45) Date of Patent: Apr. 15, 2008

(54) FOLDER SYNCHRONIZATION

(75) Inventors: Juan V. Esteve Balducci, Issaquah, WA (US); Selvaraj Nalliah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 10/648,099

(22) Filed: Aug. 26, 2003

(65) Prior Publication Data

US 2004/0103174 A1    May 27, 2004

Related U.S. Application Data

(60) Provisional application No. 60/424,106, filed on Nov. 5, 2002.

(51) Int. Cl.
*G06F 15/16* (2006.01)

(52) U.S. Cl. .................... 709/248; 707/201

(58) Field of Classification Search .............. 709/248; 707/201

See application file for complete search history.

(56) References Cited

U.S. PATENT DOCUMENTS

| | | | |
|---|---|---|---|
| 6,505,214 B1 * | 1/2003 | Sherman et al. | 707/201 |
| 6,959,194 B2 * | 10/2005 | Brouwer et al. | 455/466 |
| 2001/0054115 A1 | 12/2001 | Ferguson | |
| 2002/0099719 A1 | 7/2002 | Schwitters | |
| 2002/0120696 A1 * | 8/2002 | Mousseau et al. | 709/206 |
| 2003/0037254 A1 * | 2/2003 | Fischer et al. | 713/200 |
| 2003/0046434 A1 * | 3/2003 | Flanagin et al. | 709/248 |
| 2003/0050046 A1 * | 3/2003 | Conneely et al. | 455/412 |
| 2003/0157947 A1 * | 8/2003 | Flatal et al. | 455/466 |

OTHER PUBLICATIONS

Saito et al., "Disconnected Operations Synchronization Facility Extension for Mobile Terminal's Messaging System", Transactions of Information Processing Society of Japan, vol. 42 (11), Nov. 2001, pp. 2780-2788. Abstract.

Official Search Report of the European Patent Office in Counterpart foreign application No. 03 025 440.3 filed Nov. 5, 2003.

Tanenbaum: "Computer Networks; Third Edition" 1996, Prentice Hall, Upper Saddle River, NJ, p. 695.

* cited by examiner

*Primary Examiner*—Salad E Abdullahi
(74) *Attorney, Agent, or Firm*—Steven M. Koehler; Westman, Champlin & Kelly, P.A.

(57) ABSTRACT

A method is provided for synchronizing folders between a mobile device and a second computing device. The method includes initiating a folder synchronization request between the mobile device and the second computing device and comparing the folder hierarchy of the mobile device with the folder hierarchy of the second computing device to ascertain differences. Information is sent to at least one of the mobile device and the second computing device as a function of the ascertained differences between the folder hierarchies. The mobile device or second computing device uses the information to modify its folder hierarchy.

22 Claims, 12 Drawing Sheets

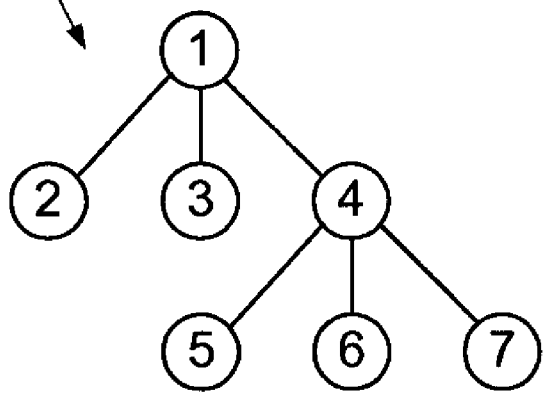
CLIENT TREE
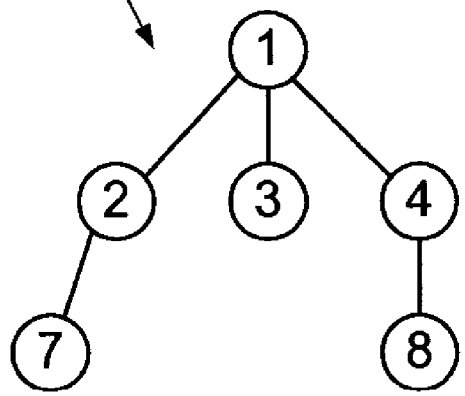
SERVER TREE
FIG. 10

FOLDER SYNCHRONIZATION

CROSS-REFERENCE TO RELATED APPLICATION

The present application is based on and claims the benefit of U.S. provisional patent application Ser. No. 60/424,106, filed Nov. 5, 2002, the content of which is hereby incorporated by reference in its entirety.

BACKGROUND OF THE INVENTION

The present invention relates to synchronization of objects between object stores on two different computing devices.

Mobile devices include a broad range of computing and communication devices that are small enough to be conveniently carried by a user. Examples of such devices include mobile phones, personal digital assistants, tablet PCs, and lap-top PCs.

Generally, the mobile device includes a processor, random access memory (RAM), and an input device such as a keyboard, touchpad or input buttons and a display. The keyboard can be integrated with the display, such as when the keyboard is incorporated as a touch sensitive display. A communication interface is optionally provided and is commonly used to communicate with other computers. A replaceable or rechargeable battery powers the mobile device. Optionally, the mobile device can receive power from an external power source that overrides or recharges the built-in battery.

While a wide variety of computing tasks and applications can be performed by such mobile devices, personal information managers (PIMs) are particularly well suited to mobile devices. PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the trademarks "MICROSOFT SCHEDULE+" and "MICROSOFT OUTLOOK" and are commercially available from Microsoft Corporation of Redmond, Wash. In addition to PIMs, however, such mobile devices may also run different types of applications, such as word processors, spread sheets, etc.

To provide users with as much freedom as possible, it is desirable to allow the user to access and change their application and PIM information from any device they choose. Thus, the user should be able to access their e-mail from a network terminal, a PDA, and a tablet PC.

However, allowing the user to access and change their information from any desired source means that the devices (e.g. on a mobile device or client and a desktop PC or server) must be able to communicate with each other to indicate changes to the information. The process of two devices sharing changes in the application and/or PIM information is known as synchronization.

In general, synchronization is not a continuous process. In other words, a mobile device does not continually try to synchronize its data because that would waste limited wireless bandwidth and place an undue drain on the mobile device's battery. Instead, synchronization is performed periodically. In addition, it is wasteful to synchronize data that has not changed.

Thus, any improvement that minimizes data transfer between a server and a mobile device for synchronization is helpful.

SUMMARY OF THE INVENTION

A method is provided for synchronizing folders between a mobile device and a second computing device. The method includes initiating a folder synchronization request between the mobile device and the second computing device and comparing the folder hierarchy of the mobile device with the folder hierarchy of the second computing device to ascertain differences. Information is sent to at least one of the mobile device and the second computing device as a function of the ascertained differences between the folder hierarchies. The mobile device or second computing device uses the information to modify its folder hierarchy.

BRIEF DESCRIPTION OF THE DRAWINGS

FIG. 10 is a pictorial representation of folder hierarchies for a client device and a second bomputing device.

DETAILED DESCRIPTION OF THE ILLUSTRATIVE EMBODIMENTS

Overview

Figure 1:
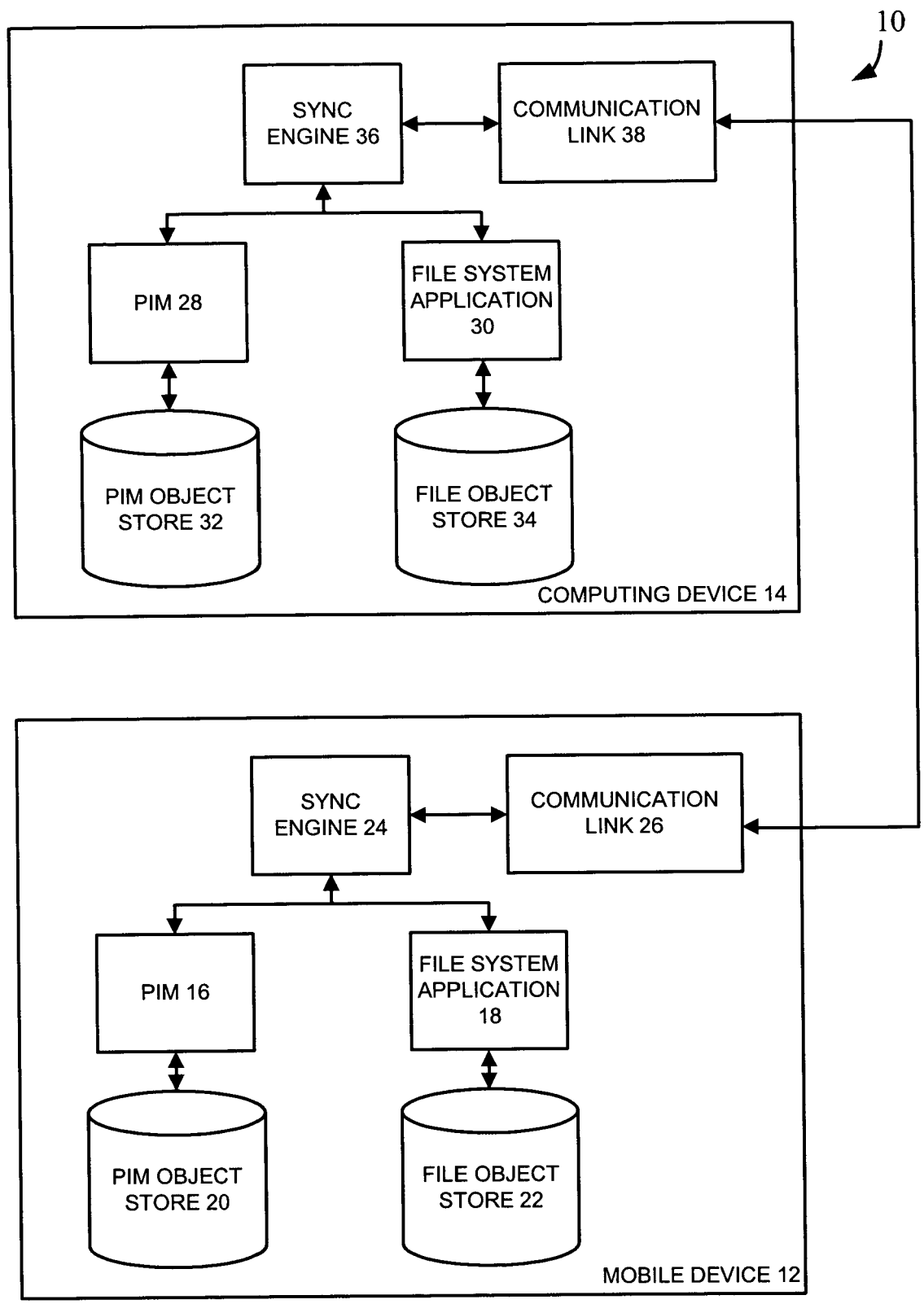
FIG. 1 is a block diagram illustrating a basic environment of the present invention.

FIG. 1 is a block diagram of a typical system or environment 10 in which the present invention operates. System 10 includes mobile device 12 and a computing device 14. Mobile device 12 includes first application program 16, second application program 18, corresponding first and second object stores 20 and 22, synchronization engine 24 and communication link 26. Computing device 14 includes similar first and second application programs 28 and 30, corresponding first and second object stores 32 and 34, synchronization engine 36 and communication link 38. It will be appreciated that both mobile device 12 and computing device 14 include a number of other components, which are discussed in greater detail below. However, for the purposes of the overview discussion presented with respect to FIG. 1, the items set out above are sufficient.

In one illustrative embodiment of the present invention, application programs 16 and 28 are personal information manager (PIM) programs, which support, for example, electronic mail messaging, scheduling, calendering, etc. Hereinafter, programs 16 and 28 will simply be referred to as PIMs 16 and 28. Of course, PIMs 16 and 28 can be configured to support a wide variety of other features, such as task lists and personalized address books, to name a few.

Object stores 20 and 32 are implemented in memory configured to store a plurality of individual records or objects, each comprising a plurality of fields or properties related to PIMs 16 and 28. In one illustrative embodiment, PIMs 16 and 28 are programs, such as that available under the commercial designation "MICROSOFT OUTLOOK", and object stores 20 and 23 are configured to store objects, each of which having a plurality of attributes or properties associated with electronic mail messaging, such as a sender's name, the recipient's name, text messages, etc. Computing device 14 executes PIM 28 to maintain objects stored in store 32, and mobile device 12 executes program 16 to maintain objects stored in object store 20. In one illustrative embodiment, each object in object store 20 comprises the same set of properties or attributes stored in object store 32, or a subset of those properties or attributes.

Similarly, application programs 18 and 30 maintain objects on associated object stores 22 and 34, respectively. In one illustrative embodiment, application programs 18 and 30 are file system applications, such as those available under the commercial designation "MICROSOFT WORD". It should also be noted that any suitable number of other application programs, and associated object stores, can be provided on mobile device 12 and computing device 14. However, for the sake of simplicity, only programs 16, 18, 28 and 30, and their associated object stores, are described herein, which have been illustrated separately for ease of understanding, but should not be considered limiting or required.

It should be noted the object stores 20, 22 and 32, 34 are illustrated separately, but in practice may reside on a single memory device for each computing device.

In one illustrative embodiment, the user desires to synchronize object stores 20 and 32 and object stores 22 and 34. Thus, there are two instances of each object associated with the pair of object stores 20 and 32 (one instance in object store 20 and one instance in object store 32) and two instances of each object associated with the pair of object stores 22 and 34 (one instance in object store 22 and one instance in object store 34). When a user changes one instance of the object stored in either object store 22 or 34, the second instance of that object in the other of stores 22 and 34 is out of sync and is desirably updated the next time mobile device 12 has two-way communication with computing device 14, so that both instances of the same object contain synchronized data. The same is true for instances of objects stored in object stores 20 and 32.

In order to accomplish synchronization, synchronization components 24 and 36 run on mobile device 12 and computing device 14, respectively. The synchronization components communicate with application programs 16, 18, 28 and 30 (or directly with the associated object stores) through defined interfaces to manage communication and synchronization.

Synchronization components 24 and 36 communicate with each other through communication links 26 and 38. Communication links 26 and 38 are illustratively commercially available communication links using a suitable communications protocol. For instance, in one illustrative embodiment, mobile device 12 is connected to computing device 14 with a physical cable which communicates using a serial communications protocol. Other communication mechanisms are also contemplated by the present invention, such as infra-red (IR) communication, direct modem communication, remote dial-up-networking communication, communication through commercially available network cards (i.e., using TCP/IP), remote access services (RAS), wireless modem, wireless cellular digital packet data (CDPD), short message services or other suitable communication mechanisms. Although the communication links are shown as being internal to mobile device 12 and computing device 14, those skilled in the art will recognize that portions of the communication links can exist outside of the devices. For example, the communication links can include communication servers located between mobile device 12 and computing device 14 and adapters such as mobile device cradles.

Prior to discussing the synchronization process and associated mechanisms in greater detail, the present discussion proceeds with respect to a more detailed description of the components of mobile device 12 and an example computing device 14 for the sake of clarity.

Computing Device 14

Computing device 14 is only one example of a suitable computing device and is not intended to suggest any limitation as to the scope of use or functionality of the invention. Neither should computing device 14 be interpreted as having any dependency or requirement relating to any one or combination of components illustrated in the exemplary computing device 14.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the concepts provided herein as computer executable instructions stored on any form of computer readable media. The invention may also be practiced in distributed computing environments where tasks are performed by remote processing devices that are linked through a communications network. In a distributed computing environment, program modules may be located in both local and remote computer storage media including memory storage devices.

Figure 2:
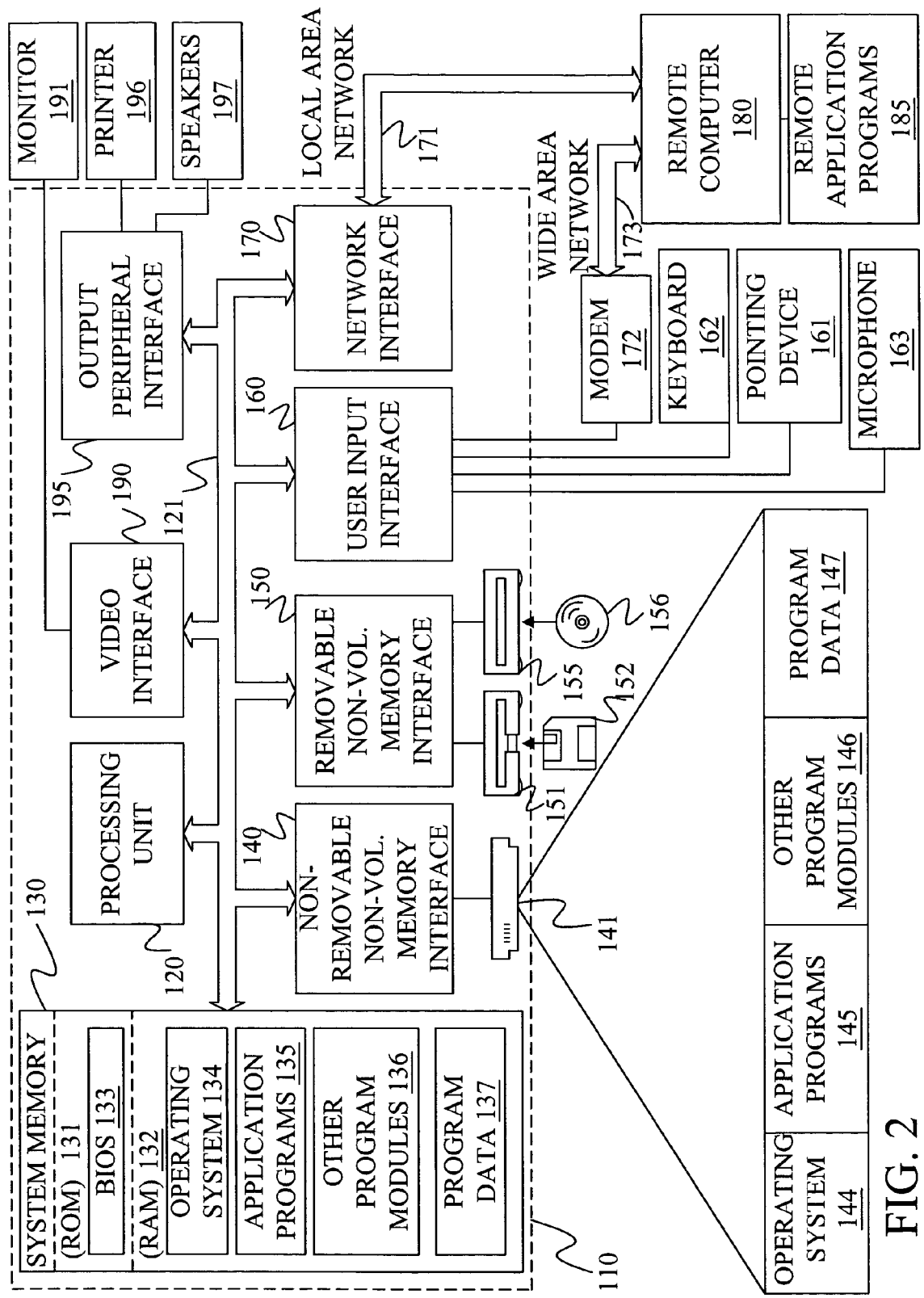
FIG. 2 is a block diagram of one embodiment of a computing device used in conjunction with a mobile device in accordance with the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

Dynamically linked libraries (DLLs), comprising a plurality of executable functions are associated with PIM 28 and application 30 for execution by processor 62. Interprocessor and intercomponent calls are facilitated preferably using the component object model (COM) as is common in programs written for Microsoft "WINDOWS" brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLLs associated with PIM 28 and program 30 are designed specifically to work in conjunction with PIM 28 and program 30 and to expose desktop synchronization interfaces that function according to a synchronization protocol. The DLLs, in turn, call interfaces exposed by PIM 28 and program 30 in order to access data representing individual properties of objects maintained in object stores 32 and 34. Object stores 32 and 34, of course, can reside in any one of the suitable memory components described with respect to FIG. 2.

Mobile Device 12

Figure 3:
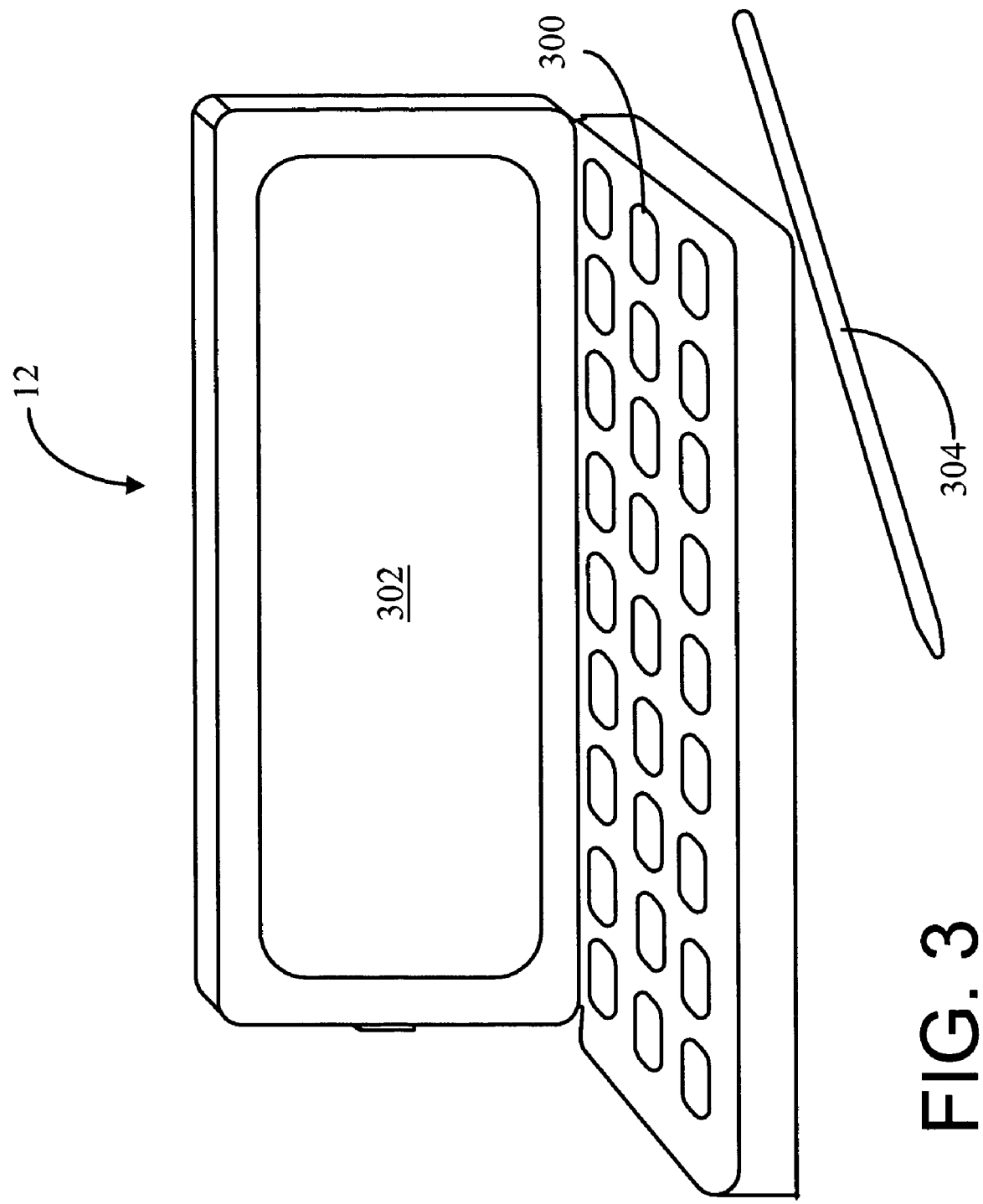
FIG. 3 is a simplified pictorial illustration of one embodiment of a mobile device in accordance with the present invention.

FIG. 3 is a simplified pictorial illustration of one preferred embodiment of a mobile device 12 which can be used in accordance with the present invention. In one embodiment, mobile device 12 includes a miniaturized keyboard 300, display 302 and stylus 304. In the embodiment shown in FIG. 3, display 302 is a liquid crystal display (LCD) which uses a contact sensitive display screen in conjunction with stylus 304. Stylus 304 is used to press or contact the display 302 at designated coordinates to accomplish certain user input functions. Miniaturized keyboard 300 is illustratively implemented as a miniaturized alpha-numeric keyboard, with any suitable and desired function keys which are also provided for accomplishing certain user input functions.

Figure 4:
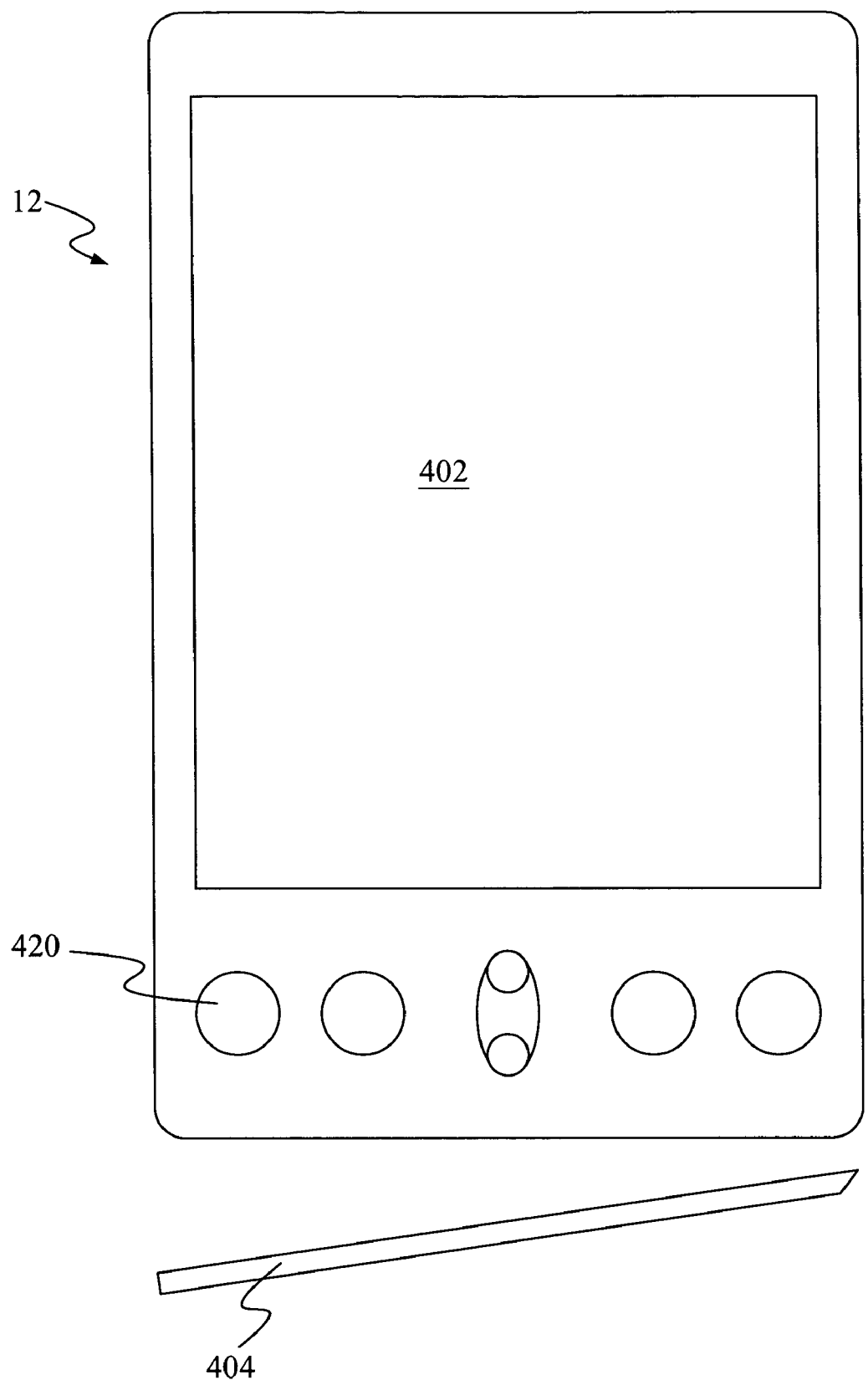
FIG. 4 is a simplified pictorial illustration of another embodiment of a mobile device in accordance with the present invention.

FIG. 4 is an illustration of a different embodiment of mobile device 12. Mobile device 12, as shown in FIG. 4, includes a touch sensitive screen 402 which can be used, in conjunction with stylus 404, to accomplish certain user input functions.

It should be noted that the display 302 and 402 for the mobile devices shown in FIGS. 3 and 4 can be the same size as one another, or different sizes from one another, but would typically be much smaller than a conventional display used with a desktop computer. For example, displays 302 and 402 shown in FIGS. 3 and 4 may be defined by a matrix of only 240×320 coordinates, or 160×160 coordinates, or any other suitable size. When mobile device 12 is a pager, the display may be even smaller.

The mobile device 12 shown in FIG. 4 also includes a number of user input keys or buttons (such as button 420) which allow the user to scroll through menu options or other display options which are displayed on display 402, or which allow the user to change applications or select user input functions, without contacting display 402.

Figure 5:
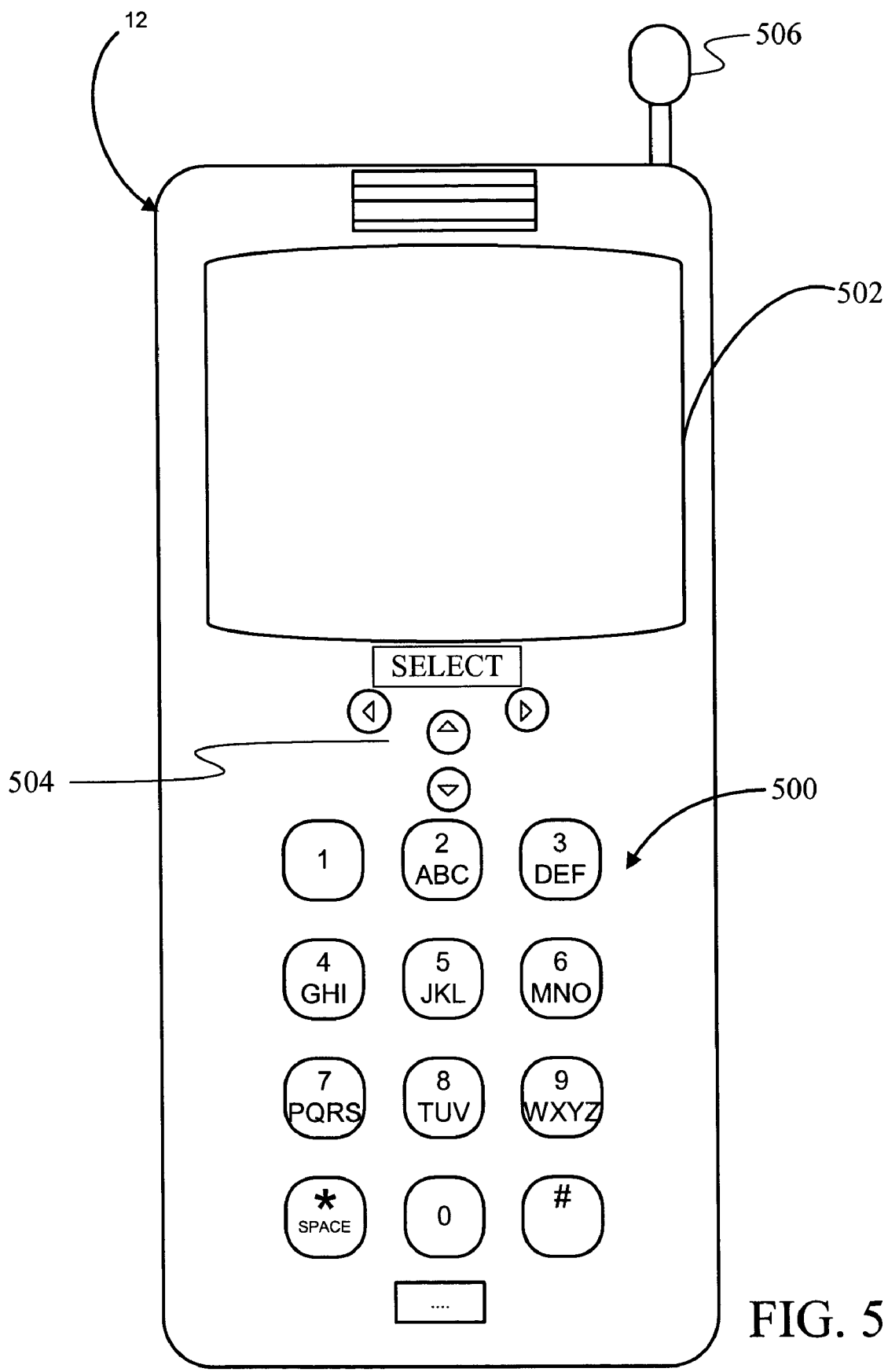
FIG. 5 is a pictorial illustration of a phone embodiment of a mobile device.

FIG. 5 provides a pictorial diagram of a phone embodiment of mobile device 12. The phone includes a set of keypads 500 for dialing phone numbers, a display 502 capable of displaying application and PIM images, and control buttons 504 for selecting items shown on the display. The phone includes an antenna 506 for receiving cellular phone signals such as General Packet Radio Service (GPRS) and 1×rtt, and Short Message Service (SMS) signals. When using a cellular phone signal, the phone establishes a connection with a carrier. Generally, the carrier charges a fee based on the length of time that this connection is maintained.

Note that other forms of the mobile device are possible under the present invention. Examples include tablet PCs and wireless-enabled lap-top computers.

Figure 6:
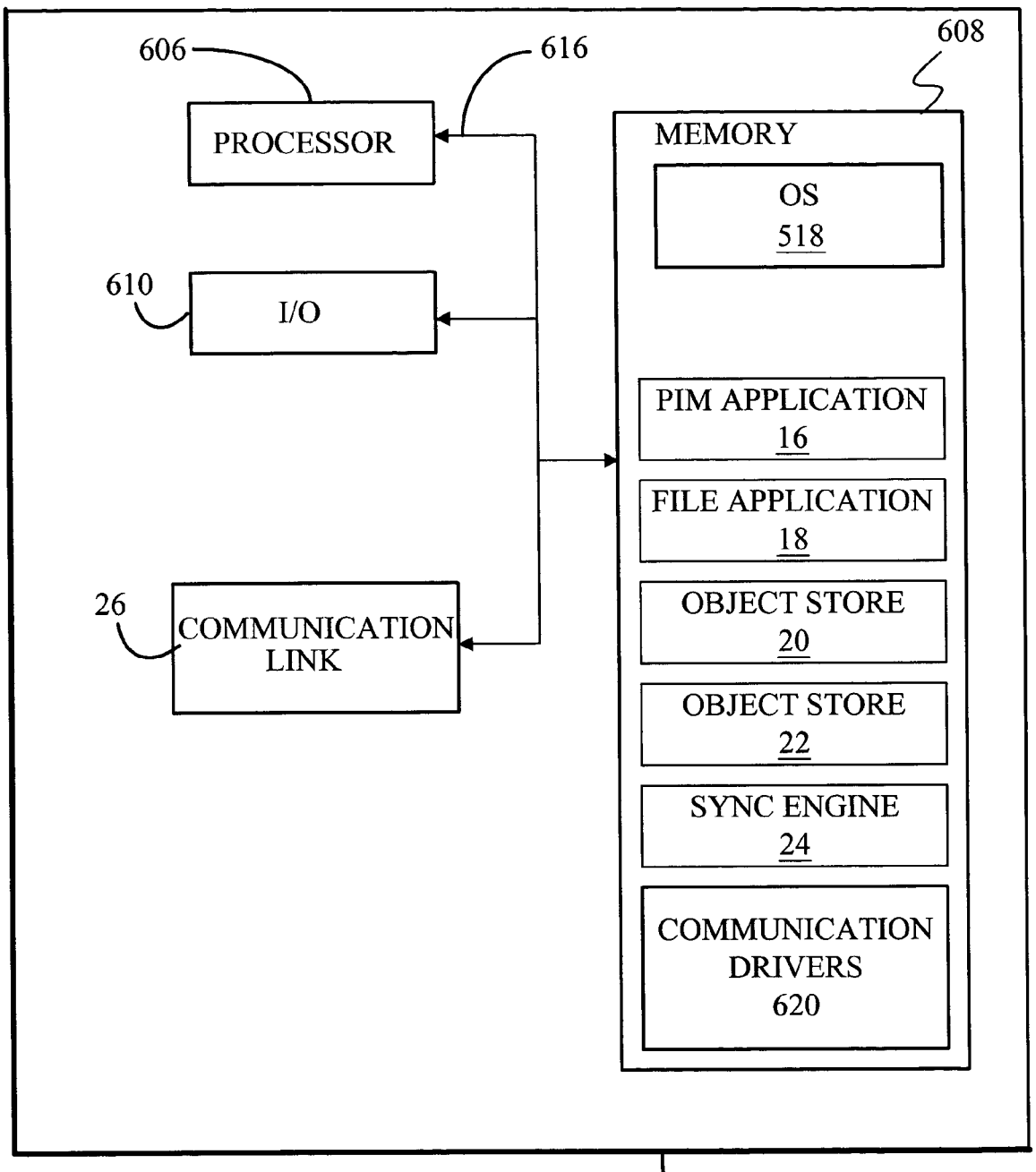
FIG. 6 is a simplified block diagram of one embodiment of a mobile device.
Figure 7:
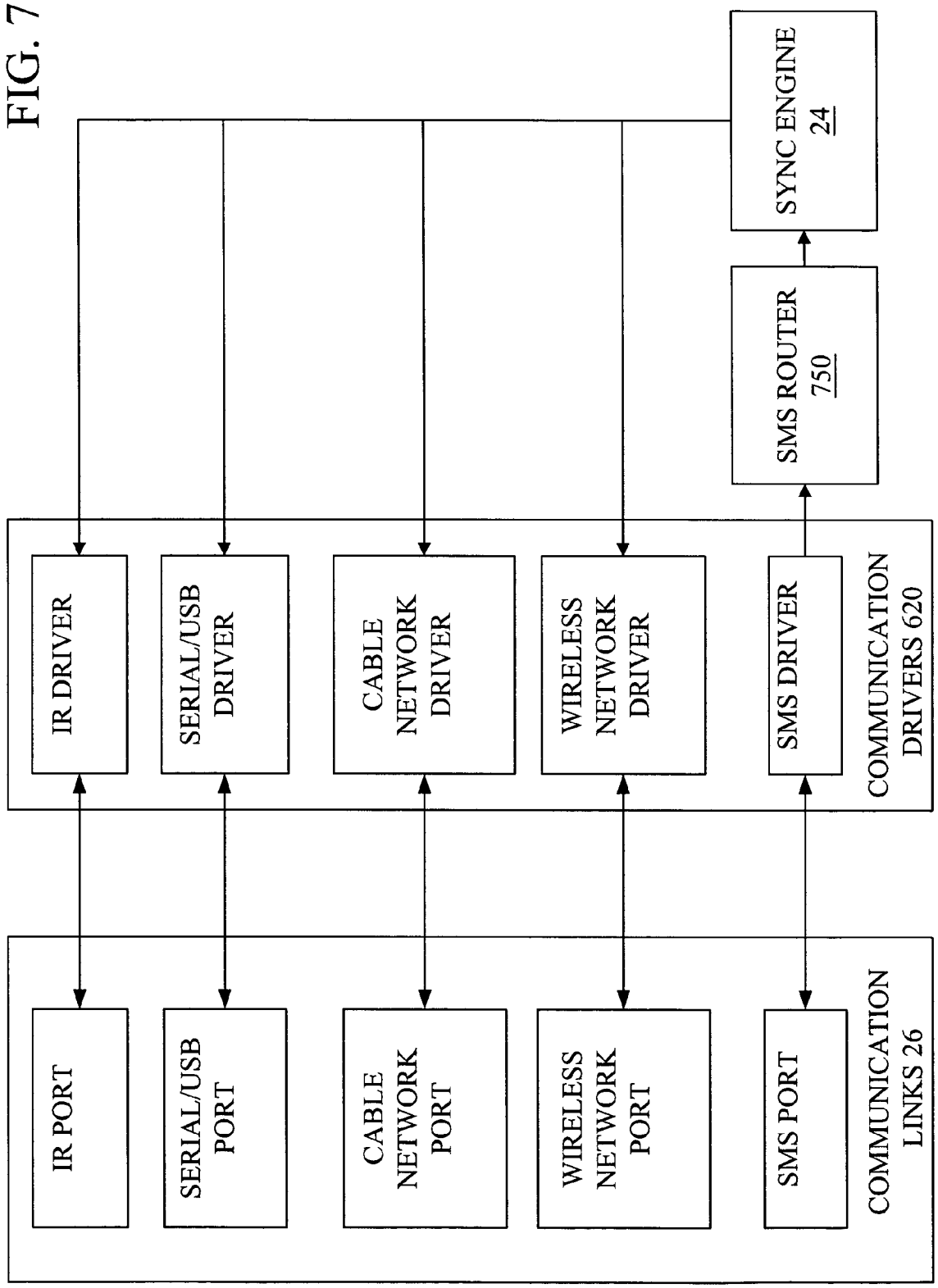
FIG. 7 is a more detailed architectural block diagram illustrating components used in synchronization.

FIG. 6 is a more detailed block diagram of mobile device 12. Mobile device 12 illustratively includes microprocessor 606, memory 608, input/output (I/O) components 610, and communication link 26. These components of mobile device 12 can be coupled for communication with one another over a suitable bus 616.

Memory 608 is preferably implemented as non-volatile electronic memory such as random access memory (RAM) with a battery back-up module (not shown) such that information stored in memory 608 is not lost when the general power to mobile device 12 is shut down. A portion of memory 608 is illustratively allocated as addressable memory for program execution, while another portion of memory 608 is optionally used for storage, such as to simulate storage on a disc drive.

Memory 608 can include operating system 618, one or more application programs (such as PIM 16 and file application 18, etc.), as well as object stores 20, 22 and sync engine 24. During operation, operating system 618 is illustratively executed by processor 606 from memory 608. The operating system 618 implements features which can be utilized by PIM 16 and file application 18 through a set of exposed application programming interfaces and methods. The objects in object stores 20 and 22 are illustratively maintained by PIM 16, file application 18 and operating system 618, at least partially in response to calls to the exposed application programming interfaces and methods.

I/O components 610, in one embodiment, are provided to facilitate input and output operations from a user of mobile device 12. I/O components 610 for various embodiments of mobile device 12 can include input components such as buttons and touch sensors and output components such as a display, a speaker, and or a printer port.

Communication link 26 is any suitable communication interface. Interface 26 is illustratively used to communicate with computing device 14 as described with respect to FIG. 1. Memory 608 includes a set of communication drivers 620 that interact with communication link 26 and that translate data to and from the appropriate communication protocol necessary to allow for communication across link 26.

Figure 8:
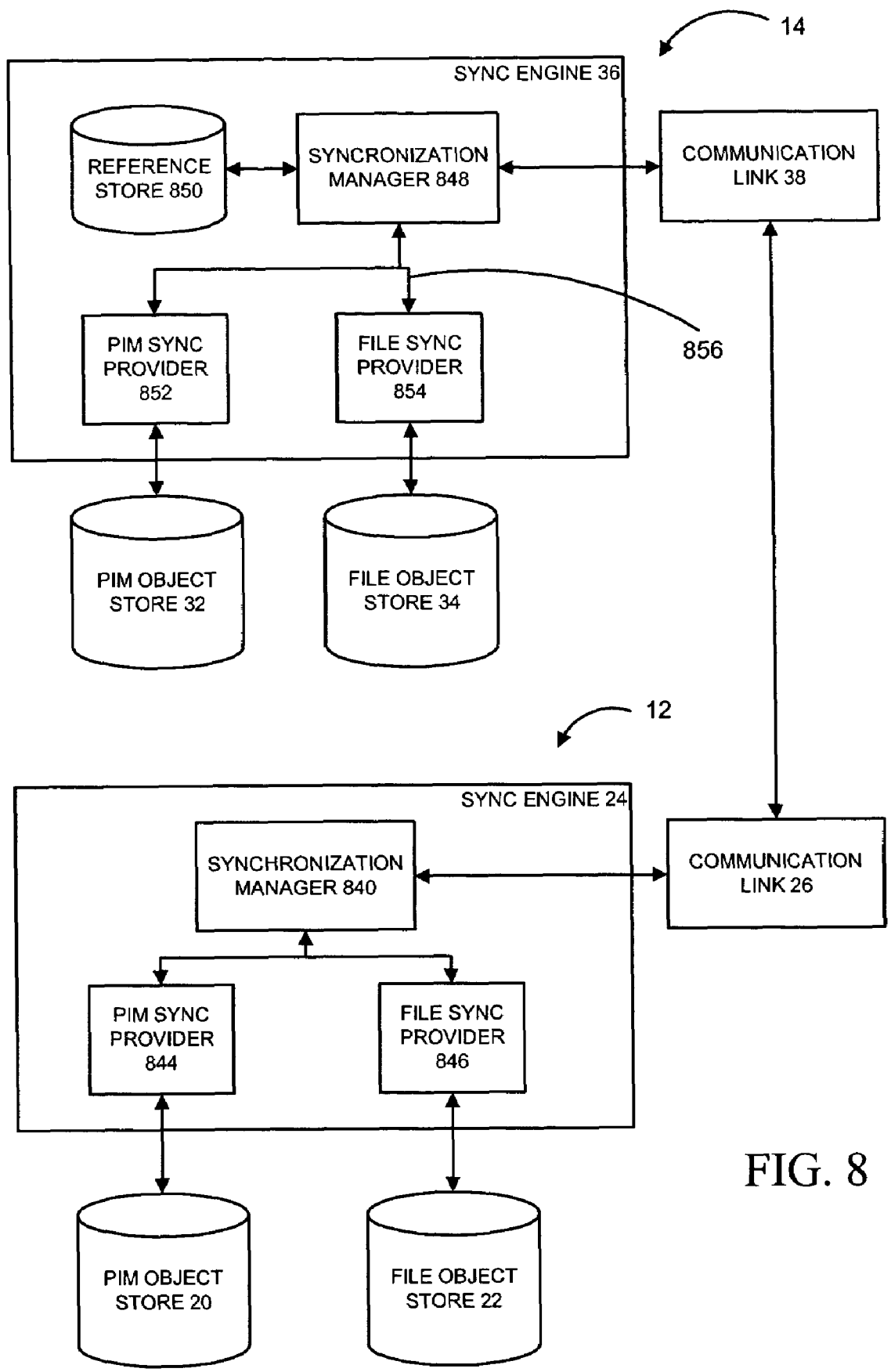
FIG. 8 is a flow diagram illustrating folder synchronization.

FIG. 8 is a more detailed block diagram of sync engine 24 on mobile device 12 and sync engine 36 on desktop 14. Sync engine 24 on mobile device 12 includes synchronization manager 840, which is coupled to a set of application programs, such as PIM sync provider 844 and file sync provider 846. PIM sync provider 844 is coupled to PIM object store 20, and file sync provider 846 is coupled to file object store 22.

Sync engine 36 on computing device 14 also includes a synchronization manager 848 coupled to an associated reference store 850 and also coupled to application programs, including PIM sync provider 852 and file sync provider 854. PIM sync provider 852 is coupled to PIM object store 32, and file sync provider 854 is coupled to file object store 34. While providers 844, 846, 852 and 854 are shown coupled directly to associated object stores, those providers could also be coupled to the object stores through the application programs 16, 18, 28 and 30 instead. However, for the sake of simplicity, the present discussion proceeds only with respect to the arrangement shown in FIG. 8.

Sync providers 852 and 854 expose application programming interfaces (APIs) 856 which can be called by synchronization manager 848 to read and store objects and object properties on object stores 32 and 34. The interfaces 856 generally allow the creation of data bases for different types of objects, and allow application programs to read and write property names and values to and from respective objects within each data base.

The interfaces are well documented as the IReplStore, and IReplObjHandler interfaces. Each of these interfaces exposes a number of well documented methods. For example, the IReplStore interface exposes 22 methods, which can be generally classified as methods, which are used to manipulate the data store, methods used for object enumeration, methods used to obtain object information, methods used to manipulate handles to objects, methods used for user interface functions, and a number of miscellaneous methods. The IReplObjHandler interface exposes methods which are used to serialize objects by turning an object into a series of bytes, and to deserialize objects by turning the series of bytes back into an object. The methods included in the interface are also used to delete an object from the corresponding object store.

Synchronization manager 848, in turn, exposes a well documented interface known as the IReplNotify interface to providers 852 and 854. This interface exposes four well documented methods, which are used to notify synchronization manager 848 of any change or deletion made to an object in a corresponding object store, to set text to be displayed in a status bar where synchronization status can be observed by the user, to obtain a window handle which is used as a parent window of any modal dialogue or message box, and to obtain information about a mobile device which has been selected, or which is connected to the computing device.

Each of the providers 852 and 854 are implemented to specifically work in conjunction with a particular application program 28 or 34, respectively. In general, because the application program interface (API) 856 is standardized, it allows synchronization manager 848 to access and synchronize any number of different application programs, as long as the required interface methods are implemented for each application by corresponding providers.

On mobile device 12, providers 844 and 846 also provide the well documented IReplObjHandler interface such that objects in the associated object stores 20 and 22 can be serialized and deserialized. Providers 844 and 846 also illustratively implement three additional functions which can be used to initialize and terminate the provider, to handle object identification and change detection, and to retrieve device information about a particular object type. These functions and interfaces are also well documented.

Synchronization manager 848 manipulates reference store 850 to maintain a mapping between instances of objects stored in object stores 32 and 34 on computing device 14 and instances of the same objects stored in object stores 20 and 22 on mobile device 12. Objects are identified by handles, which are created by providers 852 and 854. The handles are opaque to synchronization manager 848, in that synchronization manager 848 need not be concerned with the actual composition of the handles although the handles are manipulated and stored by synchronization manager 848.

Generally, in order to maintain the mapping, synchronization manager 848 maintains reference store 850 so that it contains handles corresponding respectively to a plurality of objects in the object stores 32 and 34 on computing device 14 which are to be synchronized with instances of the same objects in object stores 20 and 22 on mobile device 12. The handles in reference store 850 will typically correspond to objects that have been previously synchronized between the various object stores. The handles are updated after their corresponding objects have been synchronized.

The list of handles maintained in reference store 850 is also used to determine which items need to be synchronized to mobile device 12 the next time mobile device 12 is connected to computing device 14. In making this determination, synchronization manager 848 also determines whether objects have been added to or deleted from the object stores so that appropriate additions and deletions can be made.

The handles stored in reference store 850 should be formatted in accordance with the following criteria so that the synchronization providers 852 and 854 can perform the specified functions:

(a) Each handle should contain data that uniquely identifies an object—such as an object identifier, an ID number, a full pathname for a file system object, etc. This data should be persistent (in that it does not change for a particular object) and should not be reused for subsequently created objects. This data can be compared to determine whether two handles actually correspond to the same object. As is discussed below, this can be problematic for file system information, because the object identifier is typically the pathname, and can be changed simply by renaming the file.

(b) It should be possible to derive some object order based on the handle.

(c) The handle should have some sort of time stamp information, or version number. This information can be compared to determine whether an object has changed since the last handle was recorded in reference store 850.

These handles are provided from providers 852 and 854 to synchronization manager 848, for storage in reference store 850, during an enumeration process which is described below. This enumeration process is used to detect items which need to by synchronized when mobile device 12 is next coupled to computing device 14.

The present invention primarily deals with problems associated with attempting to synchronize PIM data stored in PIM object store 32 with PIM data stored in PIM object store 20. Thus, the remainder of the present discussion proceeds with respect to PIM data only.

It is quite common to use folders or subdirectories to organize PIM data for convenient access when needed. For instance, separate folders can be provided for contacts (names, addresses and phone numbers), tasks to be performed, scheduling or calendar information and e-mail, which can be separated based on messages received, messages sent, drafts or outgoing messages, to name a few. One well-known system for PIM data management is sold by Microsoft Corporation of Redmond, Wash. under "Outlook™". One aspect of the present invention provides a user with means to enable folders on a mobile device to be synchronized with folders on another computer device such as a desktop PC, which the user may also use to access the same data. As used herein, the computing device that is synchronized with the mobile device will be referred to as the "server"; however, this should not be considered limiting to any particular type of network or computing device.

Briefly, one aspect of the present invention enables a user to have his/her folder hierarchy on the server updated with any changes that are made on the mobile device and vice versa. Once a synchronization partnership has been established between the server and the mobile device, this aspect of the present invention indicates the changes that have been made in the folder hierarchy since the last synchronization and provides information indicative of the changes to the other device so that the same folder hierarchy can be established thereon. In one embodiment, the information comprises instructions that cause the computing device to effectuate adding, renaming, moving or deleting folder or folders. By providing information only as to the changes that have been made in the folder hierarchy, this aspect of the present invention is particularly useful for wireless communications where limited bandwidth may only be available. Without this feature, the entire folder hierarchy must be downloaded or transferred between the devices each time synchronization is to be made, which could not only take up valuable wireless bandwidth, but can also be time consuming on small computing devices such as the mobile devices described above.

Referring back to FIG. 8, folder synchronization generally is as follows. The mobile device 12 first establishes a partnership (a first synchronization operation) with the server 14. In this example, the mobile device 12 does not have any information regarding the folder hierarchy, but rather, the server 14 has the PIM data stored in a folder hierarchy. Information about the current folder hierarchy, such as a second copy, is then copied and stored, for example in reference store 850. The second copy of the folder hierarchy information can be used later to determine changes made in the folder hierarchy. The server 14 then provides information through the communications links 26 and 38 indicative of the current folder hierarchy to the mobile device 12 where the folder hierarchy is replicated. Assuming that the mobile device 12 does not have any folders for the PIM data, the information is generally indicative of commands to instruct the mobile device 12 to create each of the folders.

With the folder hierarchy replicated on the mobile device 12, any or all PIM data can also be synchronized between the mobile device 12 and the server 14. This however is not an aspect of the present invention. Generally, the PIM data is stored as objects. Synchronization of objects between the mobile device 12 and the server 14 is well-known, and therefore, will not be further described herein.

Figure 9:
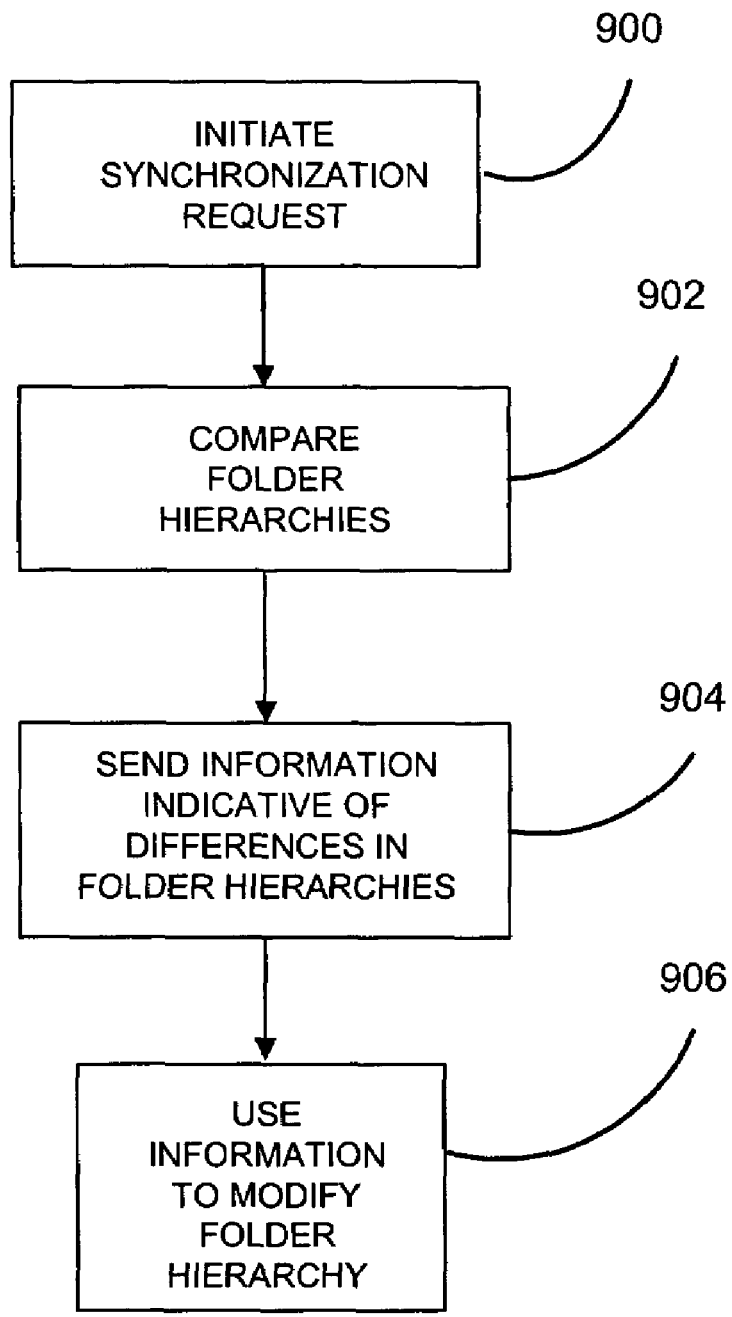
FIG. 9 is a flow diagram illustrating subsequent folder synchronization.

With the folder hierarchy established both on the server and the mobile device 12, the user can make changes to the folder hierarchy as he/she desires. In other words, the user may decide to add, delete, move or rename any folder in the folder hierarchy on the server 14 or the mobile device 12. Referring to FIG. 9, on a subsequent synchronization request 900 between the server 14 and the mobile device 12, a comparison 902 is made between the folders hierarchies on the mobile device 12 and the server 14. Through the comparison, one or more folders are detected as being added, deleted, renamed or moved. Through the communication links 26 and 38, information is then provided to the server and/or the mobile device 12 at step 904 in order to synchronize the folder hierarchies between these devices. The information is used at step 906 to add, delete, rename or move folders through commands located on these devices; thus, the information provided to the communication link need only be sufficient to initiate folder management on the respective device.

Generally, the server 14 performs the comparison of the folder hierarchies of the server 14 and the mobile device 12; however, this should not be considered limiting. The method of the present invention as described above allows changes to the folder hierarchy to be made on the mobile device 12 and/or the server 14. Thus, in order to make the comparison, the folder hierarchy of the mobile device 12 needs to be established. If changes are not to be allowed on the client device, the comparison can be made between the stored copy of the folder hierarchy of the client device on the server 14 with the actual folder hierarchy of the server 14. Information pertaining to folders that have been added, deleted, renamed or moved can then be sent to the mobile device 12 so as to replicate the folder hierarchy stored in the server 14. The folder hierarchy of the server 14 can then be stored once again in the reference store 130 to indicate the current state of the folder hierarchy of the mobile device 12. This process can be repeated with each synchronization request as necessary.

If on the other hand, the user is allowed to change the folder hierarchy stored on the mobile device 12, the stored information of the folder hierarchy of the mobile device 12 from the previous synchronization request can be used to compare it against the current folder hierarchy of the mobile device 12. Information can then be acted upon the server 14 to replicate the folder hierarchy as that present in the mobile device 12. If the user has also made changes to the folder hierarchy of the server 14, the folder hierarchy of the server 14 can then be compared with the current state of the folder hierarchy of the mobile device 12, wherein information pertaining to changes to the folder hierarchy of the mobile device 12 can be provided. As appreciated by those skilled in the art, changes made to the folder hierarchy of the server 14 can be performed first, before changes made to the folder hierarchy of the mobile device 12 if desired.

Conflicts between the folder hierarchy on the server 14 with the folder hierarchy of the mobile device 12 can be resolved, for instance, where any conflicts are resolved in favor of the folder hierarchy of the server 14, or in favor of the folder hierarchy of the mobile device 12. At this point, it should also be noted that the server 14 illustrated in FIG. 8 should not be considered as limiting in that the server 14 could also comprise a number of computing devices connected in the form of a network. For instance, it is quite common that a mobile device 14 be in communication with a selected desktop or other computing device, while the user's file folder hierarchy of PIM data is not stored on the server making or maintaining the connection to the mobile device 12, but rather, on another server in electronic communication with the server serving as the host for the mobile device 12. FIG. 8 is intended to represent any such configuration of computing devices in order to perform the functions described above whether or not the folder hierarchy is stored on one or more computing devices, or whether such information is also stored on the server having the communications link with the mobile device 12.

As described above, the folder hierarchies of the server 14 and the mobile device are compared in order to perform synchronization. Generally, a folder includes an identifier such as a name and some indication as to its location in the folder hierarchy. By comparing this information, it can be ascertained whether or not a folder has been added, deleted, moved or renamed. In one exemplary embodiment, each folder includes an unique identifier assigned by the folder management system located on the server. Although this identifier is unique, it may not be a convenient identifier for use by a user. Thus, a name property can be provided which allows the user to assign a convenient name for each folder such as "contacts", "inbox", etc. The combination of a unique identifier for each folder and a name property allows synchronization to identify those folders which have been renamed. A third property of each folder maintains the unique identifier of the parent folder so that the position of the folder within the folder hierarchy is known.

FIG. 10 pictorially illustrates a folder hierarchy 1000 for the mobile or client device 12 and a folder hierarchy 1002 for the server 14. An exemplary method for comparing folder hierarchies is discussed below and with the aid of FIGS. 11A-11D.

Finding the differences between the two folder hierarchies 1000 and 1002 can be simplified by modeling each of the hierarchies 1000 and 1002 as a corresponding list 1004 and 1006, respectively, where each of the lists 1004 and 1006 are sorted on the folder's permanent identifier. However, it should be noted that the lists 1004 and 1006 include properties such as the parent identifier and other properties such as the name of the folder, which will also be used in comparisons. In FIGS. 10 and 11A-11D, the identifiers are denoted as "1", "2", . . . "8" and the sorting method is an increasing numerical order. As appreciated by those skilled in the art, other forms of identifiers and corresponding sorting methods can be used.

Using the sorted lists 1004 and 1006 for the hierarchies 1000 and 1002, finding the difference between the two hierarchies 1000 and 1002 is a simple task of comparing the lists 1004 and 1006 looking for list items, and thereby folders that have been added/deleted or changed.

Figure 11A:
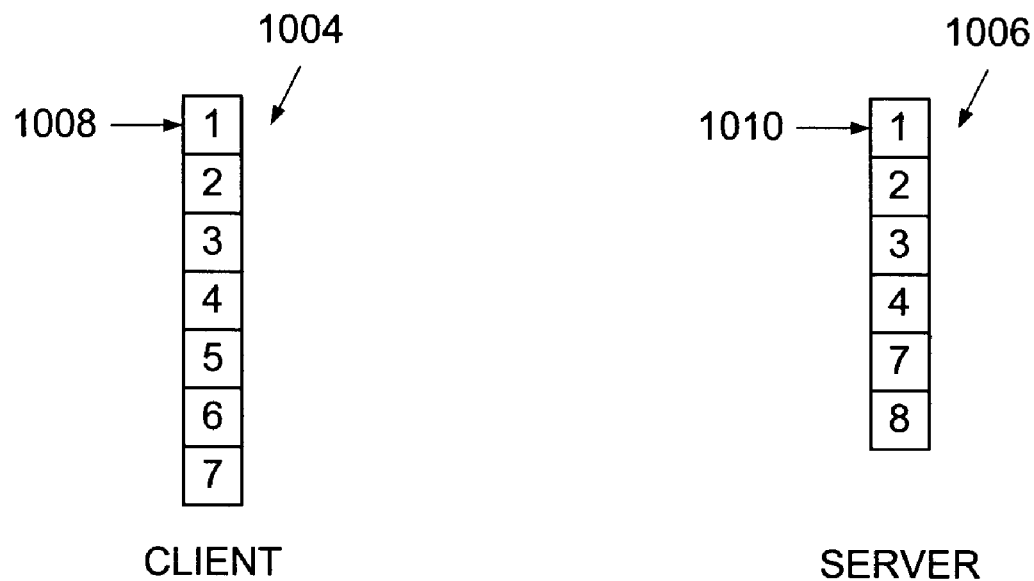
FIGS. 11A-11D pictorially illustrates comparison of the folder hierarchies of FIG. 10.

Referring to FIG. 11A, the difference between the hierarchies 1002 and 1004 is:

Folder 7's parent identifier property changed to point to 2 (basically a move);

Folders 5 & 6 were deleted; and

Folder 8 was added.

The steps for detecting the differences noted above begins with initializing pointers 1008 and 1010 at the beginning of each of the lists 1000 and 1002, respectively, and compare each respective list item. If the list items have the same identifier and the other properties are the same, both pointers are incremented. If the mobile or client device identifier is less than the server identifier, the client pointer 1008 is moved, whereas if the server identifier is less, the server pointer 1010 is moved. Hence list items skipped in this manner on the client side will be representative of folder "DELETEs", while list items on the server side will be folder "ADDs".

Figure 11B:
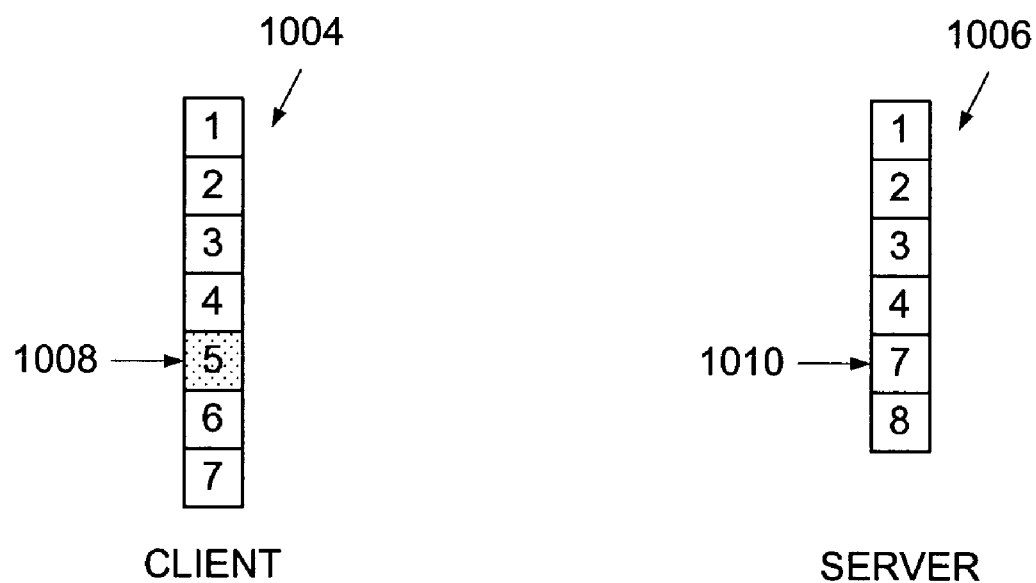

In the illustrative example of FIGS. 11A-11B, list items for the lists 1004 and 1006 each include identifiers "1", "2", "3" and "4", thereby causing each of the pointers 1008 and 1010 to increment until the client pointer 1008 reaches list item "5" and the server pointer 1010 reaches list item "7".

Figure 11C:
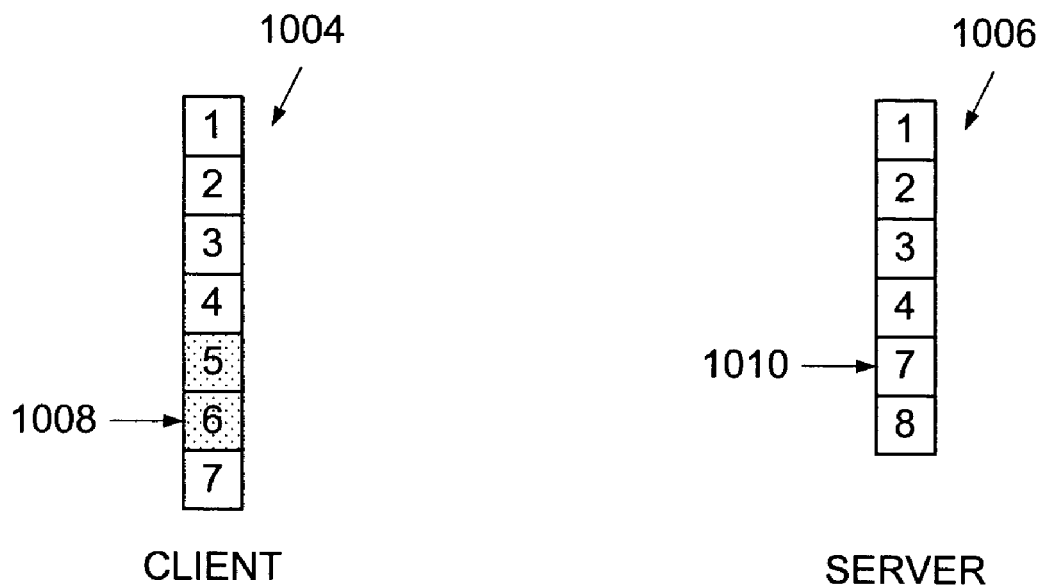

Since list item "5" does not exist on the server side and 5<7, it will be added to the update list as a DELETE and the client pointer 1008 will be incremented until an item with an identifier greater than or equal to "7" is found in the client list 1004 as illustrated in FIG. 11C. Since list item "6" is also less than "7", it will also get added to the update list as a DELETE.

Figure 11D:
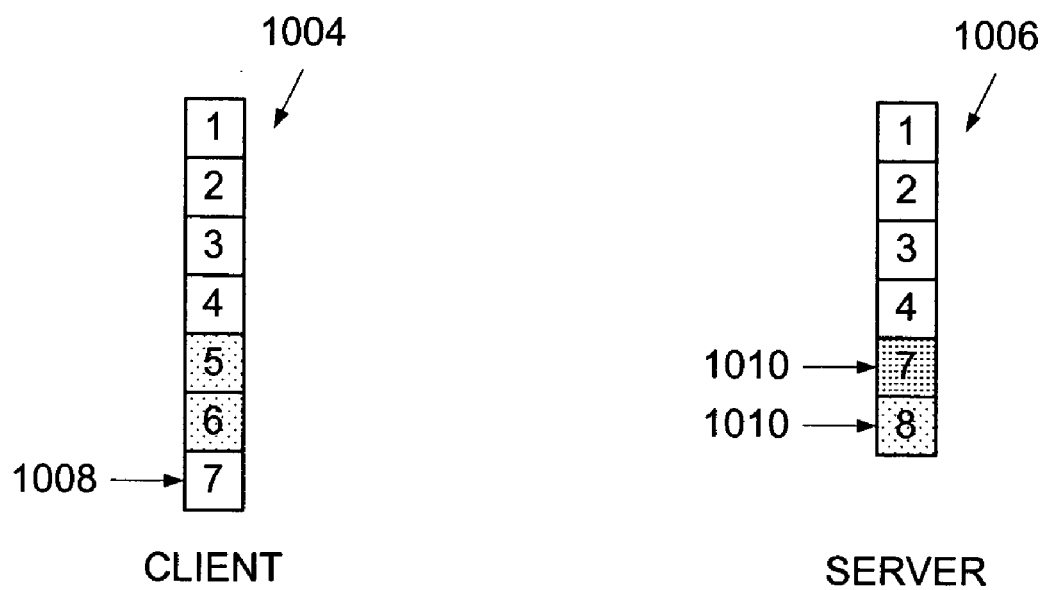

In FIG. 11D, The client pointer 1008 is incremented again and this time the list item for both lists 1004 and 1006 will be the same "7". However, upon comparison of the parent identifiers, it will be apparent that the list item of "7" has changed from 4 to 2. A CHANGE will be added to the update list to reflect this change. Changes in the name of the folders can be similarly detected.

Now when the two pointers 1008 and 1010 are incremented, the end of the client list 1004 will be reached and all the items left in the server list 1006 will be ADDs—in this case "8" will be added to the update list as an ADD.

The appendix below provides request and response examples using a markup language such as XML format; however, other formats can be used as well. An exemplary server architecture and client side interfaces are also provided.

Although the present invention has been described with reference to preferred embodiments, workers skilled in the art will recognize that changes may be made in form and detail without departing from the spirit and scope of the invention.

APPENDIX

Synchronization Model

In general, the folder hierarchy synchronization model includes:

1. Client sends first sync request and gets back a unique synchronization key ("SyncKey") along with the complete server folder hierarchy.
2. Client uses online folder commands to make changes.
3. Client sends subsequent sync request.
4. Server responds with the server side changes ("deltas").

With the client using the folder commands to make changes the benefits include—the client does not have to do any change tracking and conflicts do not have to be dealt with on the server side.

The following provides exemplary requests and responses.

1.1 First Sync Request/Response Format

```
---------------------- Request ----------------------
<?xml version="1.0" encoding="utf-8"?>
<FolderSync xmlns="FolderHierarchy:" xmlns:A="AirSync:">
    <Version>1.0</Version>
    <SyncKey>0</SyncKey>
</FolderSync>
---------------------- Response ----------------------
<?xml version="1.0" encoding="utf-8"?>
<FolderSync xmlns="FolderHierarchy:" xmlns:A="AirSync:">
    <Version>1.0</Version>
    <SyncKey>{D55A3A09-C134-4E17-A0EE-
3557963D5111}1</SyncKey>
    <Status>1</Status>
    <Changes>
        <Add>
            <ServerId>1C29CDAA-525843B0D8E</ServerId>
            <ParentId>1C29CDAA-525843B0D8D</ParentId>
            < DisplayName >Folder#1</DisplayName>
            <Type>1</Type>
        </Add>
        <Add>
            <ServerId>1C29CDAA-525843B0D8F<ServerId>
            <ParentId>1C29CDAA-525843B0D8D</ParentId>
            <DisplayName>Folder#2</DisplayName>
            <Type>2</Type>
        </Add>
        <Add>
            <ServerId>1C29CDAA-525843B0D90</ServerId>
            <ParentId>1C29CDAA-525843B0D8D</ParentId>
            <DisplayName> Folder#3</DisplayName>
            <Type>1</Type>
        </Add>
    </Changes>
</FolderSync>
```

1.2 Subsequent Sync Request/Response Format

```
----------------------- Request -----------------------
<?xml version="1.0" encoding="utf-8"?>
<FolderSync xmlns=" FolderHierarchy:" xmlns:A="AirSync:">
    <Version>1.0</Version>
    <SyncKey>{D55A3A09-C134-4E17-A0EE-
3557963D5111}1</SyncKey>
</FolderSync>
----------------------- Response -----------------------
<?xml version="1.0" encoding="utf-8"?>
<FolderSync xmlns="FolderHierarchy:" xmlns:A="AirSync:">
    <Version>1.0</Version>
    <A:SyncKey>{D55A3A09-C134-4E17-A0EE-
3557963D5111}2</A:SyncKey>
    <A:Status>1</A:Status>
    <Changes>
        <Add>
            <ServerId>1C29CDAA-525843B0D8E</ServerId>
            <ParentId>1C29CDAA-525843B0D8D</ParentId>
                <DisplayName>Folder#1</DisplayName>
            <Type>1</Type>
        </Add>
        <Delete>
            <ServerId>1C29CDAA-525843B0D8B</ServerId>
        </Delete>
        <Change>
            <ServerId>1C29CDAA-525843B0D8F<ServerId>
            <ParentId>1C29CDAA-525843B0D8D</ParentId>
            <DisplayName>Changed Folder Name</DisplayNam
>
            <Type>2</Type>
        </Change>
        <Change>
            <ServerId>1C29CDAA-525843B0D90</ServerId>
            <ParentId>1C29CDAA-525843B0D8D</ParentId>
            <DisplayName> Folder Name</DisplayName>
            <Type>1</Type>
        </Change>
    </Changes>
</FolderSync>
```

1.3 Create Folder Request/Response Format

```
----------------------- Request -----------------------
<?xml version="1.0" encoding="utf-8"?>
<FolderCreate xmlns="FolderHierarchy:" xmlns:A="AirSync:">
    <Version>1.0</Version>
    <SyncKey>{D55A3A09-C134-4E17-A0EE-
3557963D5111}1</SyncKey>
    <Name>New Folder</Name>
    <ParentId>1C29CDAA-525843B0D8D<ParentId>
    <Type>1</Type>
    <ContentClass>Contacts</ContentClass>
</FolderCreate>
----------------------- Response -----------------------
<?xml version="1.0" encoding="utf-8"?>
<FolderCreate xmlns="FolderHierarchy:" xmlns:A="AirSync:">
    <Version>1.0</Version>
    <SyncKey>{D55A3A09-C134-4E17-A0EE-
3557963D5111}2</SyncKey>
    <Status>1</Status>
        <ServerId>1C29CDAA-525843B0D8DE</ServerId>
</FolderCreate>
```

1.4 Delete Folder Request/Response Format

```
----------------------- Request -----------------------
<?xml version="1.0" encoding="utf-8"?>
<FolderDelete xmlns="FolderHierarchy:" xmlns:A="AirSync:">
    <Version>1.0</Version>
    <SyncKey>{D55A3A09-C134-4E17-A0EE-
3557963D5111}2</SyncKey>
    <ServerId>1C29CDAA-525843B0D8D<ServerId>
</FolderDelete>
----------------------- Response -----------------------
<?xml version="1.0" encoding="utf-8"?>
<FolderDelete xmlns="FolderHierarchy:" xmlns:A="AirSync:">
    <Version>1.0</Version>
    <SyncKey>{D55A3A09-C134-4E17-A0EE-
3557963D5111}3</SyncKey>
    <Status>1</Status>
</FolderDelete>
```

1.5 Update Folder Request/Response Format

```
----------------------- Request -----------------------
<?xml version="1.0" encoding="utf-8"?>
<FolderUpdate xmlns="FolderHierarchy:" xmlns:A="AirSync:">
    <Version>1.0</Version>
    <SyncKey>{D55A3A09-C134-4E17-A0EE-
3557963D5111}3</SyncKey>
    <ServerId>1C29CDAA-525843B0D8D</ServerId>
    <ParentId>1C29CDAA-525843B0D8D</ParentId>
    <DisplayName>Changed Folder</DisplayName>
</FolderUpdate>
----------------------- Response -----------------------
<?xml version="1.0" encoding="utf-8"?>
<FolderUpdate xmlns="FolderHierarchy:" xmlns:A="AirSync:">
    <Version>1.0</Version>
    <A:SyncKey>{D55A3A09-C134-4E17-A0EE-
3557963D5111}4</A:SyncKey>
    <A:Status>1</A:Status>
</FolderUpdate>
```

Server Architecture

1.6 First Sync

When the client issues the first sync command, the server generates a new GUID for the SyncKey and creates the FolderHierarchy syncfile under the user's NON_IPM_SUB-TREE.

/exchange/<username>/NON_IPM_SUBTREE/Microsoft-Server-ActiveSync/<DeviceType>/<DeviceId>/FolderHierarchySyncFile The folder hierarchy syncfile will contain the last synckey and a snap shot of the current client tree. To ensure that the client tree snap shot is always up-to-date all folder commands will also update the folder hierarchy syncfile.

1.7 Subsequent Sync

During subsequent sync sessions, the server first loads up the previously saved syncfile and gets the client tree snap shot. The server then does a DAV SEARCH request to get the server tree snap shot. A difference of the two trees is the "delta" that will to be sent down to the client.

Client Side Interface

The exemplary client interfaces support the following operations:
- Folder Updates (implicit moves/renames)
- Folder Deletes
- Folder Creates
- Folder Hierarchy Sync

1.8 IMassFolderLayer2 Interface

```
interface IMassFolderLayer2 : IUnknown
{
    //
    // Initialization
    //
    HRESULT Initialize(IMalloc **ppIMalloc);
    HRESULT UnInitialize( );
    //
    // Folder operations
    //
    HRESULT      CreateFolder(WCHAR      *wszSyncKey,
SYNC_FOLDER_NODE *psfnFolder);
    HRESULT      DeleteFolder(WCHAR      *wszSyncKey,
SYNC_FOLDER_NODE *psfnFolder);
    HRESULT      UpdateFolder(WCHAR      *wszSyncKey,
SYNC_FOLDER_NODE *psfnFolder);
    HRESULT Synchronize(WCHAR *wszSyncKey);
    //
    // Parse functions
    //
    HRESULT ParseCreateResponse(IStream       *pIStream,
                    FOLDER_STATUS_CODE *pfscStatus,
                    WCHAR          *wszServerID);
    HRESULT                ParseDeleteResponse(IStream
*pIStream,
                    FOLDER_STATUS_CODE *pfscStatus);
    HRESULT                ParseUpdateResponse(IStream
*pIStream,
                    FOLDER_STATUS_CODE *pfscStatus);
    HRESULT ParseSyncResponse(IStream        * pIStream,
            FOLDER_STATUS_CODE   * pfscStatus,
            SYNC_FOLDER_CHANGE  **ppsfcChanges,
            ULONG                * pulCount);
}
typedef struct tagSYNC_FOLDER_NODE
{
    WCHAR           * wszName;         //
DisplayName of folder
    WCHAR           * wszParentId;      //
Permanent id of parent folder
    WCHAR           * wszPermId;        //
Permanent Id for this folder
    WCHAR           * wszContentClass; // Content class
for the folder
    SYNC_FOLDER_ID    sfiType;         // Type
    of folder
}SYNC_FOLDER_NODE;
typedef enum tagSYNC_FOLDER_CHANGE_TYPE
{
    CHANGE_TYPE_ADD,
    CHANGE_TYPE_DELETE,
    CHANGE_TYPE_UPDATE,
    CHANGE_TYPE_MAX
}SYNC_FOLDER_CHANGE_TYPE;
typedef struct tagSYNC_FOLDER_CHANGE_NODE
{
    SYNC_FOLDER_CHANGE_TYPE    sfcChange;
    SYNC_FOLDER_NODE           sfnFolder;
}FOLDER_CHANGE_NODE;
typedef enum tagSYNC_FOLDER_ID
{
    SYNC_FOLDER_INVALID = 0,
    SYNC_FOLDER_CUSTOM,
    SYNC_FOLDER_INBOX,
    SYNC_FOLDER_DRAFTS,
    SYNC_FOLDER_DELETED_ITEMS,
    SYNC_FOLDER_SENT_ITEMS,
    SYNC_FOLDER_OUTBOX,
    SYNC_FOLDER_TASKS,
    SYNC_FOLDER_CALENDAR,
    SYNC_FOLDER_CONTACTS,
    SYNC_FOLDER_NOTES,
    SYNC_FOLDER_SENDMSG,
    SYNC_FOLDER_JOURNAL,
    SYNC_FOLDER_MAX
} SYNC_FOLDER_ID;
typedef enum tagSYNC_STATUS_CODE
{
    FOLDER_STATUS_CODE_INVALID = 0,
    FOLDER_STATUS_CODE_SUCCESS,
    FOLDER_STATUS_CODE_PROTOCOL_VER,
    FOLDER_STATUS_CODE_SYNCKEY,
    FOLDER_STATUS_CODE_PROTOCOL,
    FOLDER_STATUS_CODE_SYNC_SERVER, ??
    FOLDER_STATUS_CODE_DATA_SERVER, ??
    FOLDER_STATUS_CODE_ACCESS_DENIED, ??
    FOLDER_STATUS_CODE_TIME_OUT,
    FOLDER_STATUS_CODE_OBJ_NOT_FOUND, ??
    FOLDER_STATUS_CODE_DISK_SPACE,
    FOLDER_STATUS_CODE_ALREADY_EXISTS,
    FOLDER_STATUS_CODE_SPECIAL_FOLDER,
    FOLDER_STATUS_CODE_NOT_FOUND,
    FOLDER_STATUS_CODE_PARENT_NOT_FOUND,
    FOLDER_STATUS_CODE_UNKNOWN,
    FOLDER_STATUS_CODE_MAX
} SYNC_STATUS_CODE;
```

1.9 IMassFolderLayer2::Initialize

This is a one time initialization method for the IMassSyncLayer2. This method is called to allow the IMassSyncLayer2 a chance to allocate memory for internal data structures. It should only be called once during the lifetime of the object, as the IMassSyncLayer2 can be used to build and parse multiple streams without re-initialization. Be prepared to handle an E_OUTOFMEMORY result.

```
HRESULT Initialize (
    IMalloc **ppIMalloc
) ;
```

Parameters ppIMalloc

[out] IMalloc interface which clients are to use in order to free any memory allocated by this interface.

Return Values

Returns S_OK if successful.

Remarks

Clients should cache the returned IMalloc pointer and call IMalloc::Release( ) after calling IMassFolderLayer2::Release( ).

1.10 IMassFolderLayer2::CreateFolder

Clients call this method to create a new folder.

```
HRESULT CreateFolder (
    WCHAR            *wszSyncKey,
    SYNC_FOLDER_NODE *psfnFolder
);
```

Parameters wszSyncKey

[in] string containing the current synckey value.

psfnFolder

[in] ptr to SYNC_FOLDER_NODE containing the properties for this new folder.

Return Values

Returns S_OK if successful.

Remarks

The SYNC_FOLDER_NODE can contain an empty ParentId in which case the root folder is assumed—all other fields have to be filled in.

1.11 IMassFolderLayer2::DeleteFolder

Clients call this method to delete a folder.

```
HRESULT DeleteFolder (
    WCHAR            *wszSyncKey,
    SYNC_FOLDER_NODE *psfnFolder
);
```

Parameters wszSyncKey

[in] string containing the current synckey value.

psfnFolder

[in] ptr to SYNC_FOLDER_NODE containing the properties for this new folder.

Return Values

Returns S_OK if successful.

Remarks

The SYNC_FOLDER_NODE passed in must have its PermanentId field set, all other fields will be ignored.

1.12 IMassFolderLayer2::UpdateFolder

Clients call this method to make changes to a folder. Moves and renames are performed implicitly using this method.

```
HRESULT UpdateFolder (
    WCHAR            *wszSyncKey,
    SYNC_FOLDER_NODE *psfnFolder
);
```

Parameters wszSyncKey

[in] string containing the current synckey value.

psfnFolder

[in] ptr to SYNC_FOLDER_NODE containing the updated properties for the folder.

Return Values

Returns S_OK if successful.

Remarks

All properties of the SYNC_FOLDER_NODE have to be set (except the content class?).

1.13 IMassFolderLayer2::Synchronize

Clients call this method to get the current folder hierarchy changes from the server.

```
HRESULT Synchronize (
    WCHAR* wszSyncKey
);
```

Parameters wszSyncKey

[in] String containing the current folder hierarchy synckey value.

Return Values

Returns S_OK if successful.

1.14 IMassFolderLayer2::ParseCreateResponse

Clients call this method to parse the XML response for the CreateFolder command. The function returns the status of the command and the permanent Id of the new folder (if successful).

```
HRESULT ParseCreateFolder (
    IStream             *pIStream,
    FOLDER_STATUS_CODE  *pfscStatus,
    WCHAR               *wszPermanentId,
);
```

Parameters pIStream

[in] ptr to the response XML stream.

pfscStatus

[out] set to the status of the command.

wszServerId

[out] set to the PermanentId of the new folder.

Return Values

Returns S_OK if successful.
The status returned can be any of the following:
FOLDER_STATUS_CODE_SUCCESS
FOLDER_STATUS_CODE_ALREADY_EXISTS
FOLDER_STATUS_CODE_SPECIAL_FOLDER
FOLDER_STATUS_CODE_PARENT_NOT_FOUND Remarks None.

1.15 IMassFolderLayer2::ParseDeleteResponse

Clients call this method to parse the XML response for the DeleteFolder command. It returns the status of the command.

```
HRESULT ParseDeleteFolder (
    IStream             *pIStream,
    FOLDER_STATUS_CODE  *pfscStatus,
);
```

Parameters pIStream

[in] ptr to response stream.

pfscStatus

[out] set status of the command.

Return Values

Returns S_OK if successful.
The status can be any of the following:
FOLDER_STATUS_CODE_SUCCESS
FOLDER_STATUS_CODE_SPECIAL_FOLDER
FOLDER_STATUS_CODE_NOT_FOUND Remarks None.

1.16 IMassFolderLayer2::ParseUpdateResponse

Clients call this method to parse the XML response for the UpdateFolder command. It returns the status of the command.

```
HRESULT ParseUpdateFolder (
    IStream             *pIStream,
    FOLDER_STATUS_CODE  *pfscStatus
);
```

Parameters pIStream

[in] ptr to response stream.

pfscStatus

[out] will be set status code of the command.

Return Values

Returns S_OK if successful.
The status can be any of the following:
FOLDER_STATUS_CODE_SUCCESS,
FOLDER_STATUS_CODE_ALREADY_EXISTS,
FOLDER_STATUS_CODE_SPECIAL_FOLDER,
FOLDER_STATUS_CODE_PARENT_NOT_FOUND Remarks None.

1.17 IMassFolderLayer2::ParseSyncResponse

Clients call this method to parse the XML response for the DeleteFolder command. It returns the status of the command and the folder hierarchy changes.

```
HRESULT ParseSyncFolder (
    IStream              *pIStream,
    FOLDER_STATUS_CODE *pfscStatus,
    SYNC_FOLDER_CHANGE **ppsfcChanges,
    ULONG              *pulCount
);
```

Parameters pIStream

[in] ptr to response stream.

pfscStatus

[out] set to the status code of the command.

ppsfcChanges

[out] set to an array of SYNC_FOLDER_CHANGEs containing the changes to the folder hierarchy.

pulcount

[out] set to the size of the change array above.

Return Values

Returns S_OK if successful.
The status code returned can be any one of the following:
FOLDER_STATUS_CODE_SUCCESS,
FOLDER_STATUS_CODE_PROTOCOL_VER,
FOLDER_STATUS_CODE_SYNCKEY,
FOLDER_STATUS_CODE_PROTOCOL,
FOLDER_STATUS_CODE_SYNC_SERVER, ??
FOLDER_STATUS_CODE_DATA_SERVER, ??
FOLDER_STATUS_CODE_ACCESS_DENIED, ??
FOLDER_STATUS_CODE_TIME_OUT,
FOLDER_STATUS_CODE_OBJ_NOT_FOUND, ??
FOLDER_STATUS_CODE_DISK_SPACE, Remarks None.

What is claimed is:

1. A method of synchronizing folders between a mobile device and a second computing device, the method comprising:
    initiating a folder synchronization request between the mobile device and the second computing device;
    comparing the folder hierarchy of the mobile device with the folder hierarchy of the second computing device to ascertain differences, wherein comparing includes modeling the folder hierarchy of the mobile device and the folder hierarchy of the second computing device each as a sorted list of folder identifiers and ascertaining differences between the folder hierarchies by ascertaining differences between the sorted lists of folder identifiers;
    sending information to at least one of the mobile device and the second computing device, the information being a function of the ascertained differences between the folder hierarchies; and
    using the information to modify at least one of the folder hierarchy of the mobile device and the folder hierarchy of the second computing device.

2. The method of claim 1 and further comprising:
    establishing a common folder hierarchy between the mobile device and the second computing device.

3. The method of claim 2 and further comprising:
    reestablishing the common folder hierarchy between the mobile device and the second computing device after modifying at least one of the folder hierarchy of the mobile device and the folder hierarchy of the second computing device.

4. The method of claim 2 wherein establishing includes storing a copy of the common folder hierarchy.

5. The method of claim 4 wherein comparing includes comparing the folder hierarchy of the second computing device with the stored copy of the common folder hierarchy.

6. The method of claim 4 wherein comparing includes comparing the folder hierarchy of the mobile device with the stored copy of the common folder hierarchy.

7. The method of claim 1 wherein sending information comprises sending the information in a markup language format.

8. The method of claim 1 wherein using the information comprises executing instructions on the mobile device or the second computing device to add, delete, move or rename a folder.

9. The method of claim 1 and further comprising:
    identifying if a folder has been renamed.

10. The method of claim 1 wherein ascertaining differences between the sorted lists includes detecting differences by beginning at an end of each of the sorted lists and detecting differences in folder identifiers while incrementing through the lists.

11. The method of claim 10 and further comprising tracking positions of common folder identifiers within the sorted lists.

12. A computer readable storage medium having instructions executable by a computer, which, when implemented, cause the computer to synchronize folders between a mobile device and a second computing device, the instructions comprising:
    receiving a folder synchronization request from the mobile device;
    comparing a folder hierarchy of the mobile device with a folder hierarchy of the second computing device to ascertain differences, wherein comparing includes modeling the folder hierarchy of the mobile device and the folder hierarchy of the second computing device each as a sorted list of folder identifiers and ascertaining differences between the folder hierarchies by tracking positions of common folder identifiers relative to each other in each of the lists;
    sending information to at least one of the mobile device and the second computing device, the information being a function of the ascertained differences between the folder hierarchies; and
    using the information to modify at least one of the folder hierarchy of the mobile device and the folder hierarchy of the second computing device.

13. The computer readable storage medium of claim 12 wherein the instructions further comprise:
    establishing a common folder hierarchy between the mobile device and the second computing device.

14. The computer readable storage medium of claim 13 wherein the instructions further comprise:

reestablishing the common folder hierarchy between the mobile device and the second computing device after modifying at least one of the folder hierarchy of the mobile device and the folder hierarchy of the second computing device.

15. The computer readable storage medium of claim 13 wherein establishing includes storing a copy of the common folder hierarchy.

16. The computer readable storage medium of claim 15 wherein comparing includes comparing the folder hierarchy of the second computing device with the stored copy of the common folder hierarchy.

17. The computer readable storage medium of claim 15 wherein comparing includes comparing the folder hierarchy of the mobile device with the stored copy of the common folder hierarchy.

18. The computer readable storage medium of claim 12 wherein sending information comprises sending the information in a markup language format.

19. The computer readable storage medium of claim 12 wherein using the information comprises executing instructions on the second computing device to add, delete, move or rename a folder.

20. The computer readable storage medium of claim 12 wherein the instructions further comprise:
identifying if a folder has been renamed.

21. The computer readable storage medium of claim 12 wherein each of the sorted lists comprise ascending folder identifiers.

22. The computer readable storage medium of claim 21 wherein each of the folder identifiers comprise a number.

* * * * *